US011175937B2

(12) United States Patent
Shelton et al.

(10) Patent No.: US 11,175,937 B2
(45) Date of Patent: Nov. 16, 2021

(54) VIRTUALIZED AVIONICS SYSTEMS FOR OPERATIONAL ENVIRONMENTS

(71) Applicant: The Boeing Company, Chicago, IL (US)

(72) Inventors: Jason W. Shelton, Edgewood, WA (US); Jonathan N. Hotra, Maryland Heights, MO (US); Timothy M. Mitchell, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 207 days.

(21) Appl. No.: 15/941,915

(22) Filed: Mar. 30, 2018

(65) Prior Publication Data

US 2019/0303188 A1 Oct. 3, 2019

(51) Int. Cl.
*G06F 9/455* (2018.01)
*B64D 47/00* (2006.01)

(52) U.S. Cl.
CPC ......... *G06F 9/45558* (2013.01); *B64D 47/00* (2013.01); *G06F 9/45504* (2013.01); *G06F 2009/45579* (2013.01); *G06F 2009/45595* (2013.01)

(58) Field of Classification Search
CPC ............ G06F 9/45558; G06F 9/45504; G06F 2009/45579; G06F 2009/45595; B64D 47/00; B64F 5/60
See application file for complete search history.

(56) References Cited

U.S. PATENT DOCUMENTS

| 5,778,203 A | 7/1998 | Birkedahl et al. |
|---|---|---|
| 6,895,582 B1 | 5/2005 | Greve |
| 8,341,298 B2 | 12/2012 | Wilber et al. |
| 8,522,237 B2 | 8/2013 | Hotra |
| 8,615,384 B2 | 12/2013 | Angus et al. |
| 10,162,787 B1 * | 12/2018 | Paustian ............. G06F 13/4282 |
| 10,353,727 B2 * | 7/2019 | Alvarez ................ G06F 9/5077 |
| 2004/0180653 A1 | 9/2004 | Royalty |

(Continued)

FOREIGN PATENT DOCUMENTS

EP 3040283 A1 6/2016

OTHER PUBLICATIONS

Luke et al., Replacement Strategy for Aging Avionics Computers, IEEE AES Systems Magazine, Mar. 1999 (Year: 1999).*

(Continued)

*Primary Examiner* — Lewis A Bullock, Jr.
*Assistant Examiner* — Kevin X Lu
(74) *Attorney, Agent, or Firm* — MH2 Technology Law Group LLP (57) ABSTRACT

The present disclosure is directed to emulating special-purpose hardware devices using virtual hardware. A process in accordance with various implementations consistent with the present disclosure includes emulating hardware devices using virtual devices of a virtualization system configured to emulate the hardware devices. The process also includes installing in a physical system, instances of the virtualization system including the virtual devices. The process further includes emulating the hardware devices of the physical system using the virtual devices. Additionally, the process includes communicating with equipment of the physical system using the virtual devices.

20 Claims, 4 Drawing Sheets

(56) References Cited

U.S. PATENT DOCUMENTS

| | | | | |
|---|---|---|---|---|
| 2009/0112569 | A1* | 4/2009 | Angus | H04L 67/12 |
| | | | | 703/22 |
| 2009/0119087 | A1* | 5/2009 | Ang | G06F 9/45558 |
| | | | | 703/23 |
| 2010/0318834 | A1* | 12/2010 | Planche | G06F 11/2025 |
| | | | | 714/3 |
| 2012/0015644 | A1 | 1/2012 | Danford et al. | |
| 2012/0271616 | A1* | 10/2012 | Ludwig | G06F 3/14 |
| | | | | 703/28 |
| 2013/0166271 | A1* | 6/2013 | Danielsson | G06F 11/3664 |
| | | | | 703/22 |
| 2015/0227647 | A1 | 8/2015 | Shelton | |
| 2016/0340055 | A1* | 11/2016 | Floyd | B64D 45/0015 |
| 2017/0214707 | A1* | 7/2017 | Grubel | G06F 11/301 |
| 2018/0285134 | A1* | 10/2018 | Hotra | G06F 12/063 |
| 2019/0026154 | A1* | 1/2019 | Desai | G06F 9/45554 |
| 2019/0121745 | A1* | 4/2019 | Hoppert | G06F 9/45558 |
| 2019/0173846 | A1* | 6/2019 | Patterson | G06F 9/45545 |

OTHER PUBLICATIONS

Partial European Search Report dated Oct. 14, 2019 for European Patent Application No. 19158031.5), 11 pages.

Luke et al., "Replacement Strategy for Aging Avionics Computers", IEEE Aerospace and Electronic Systems Magazine, Mar. 1999, pp. 7-11.

Extended European Search Report dated Mar. 3, 2020 in corresponding European Application No. 19158031.5, 14 pages.

Breivold et al., "Virtualize for Architecture Sustainability in Industrial Automation," 2013 IEEE 16 International Conference on Computational Science and Engineering, Dec. 3, 2013, pp. 409-415.

Lala et al., "A Design Approach for Ultrareliable Real-Time Systems," IEEE Computer Society, vol. 24, No. 5, May 1, 1991, pp. 12-22.

Examination Report dated Jul. 14, 2021 in corresponding Indian Application No. 201914006538, 8 pages.

\* cited by examiner

VIRTUALIZED AVIONICS SYSTEMS FOR OPERATIONAL ENVIRONMENTS

BACKGROUND

Modern aircraft use computing devices for controlling operations and functions. A particular computing device used in aircraft may be referred to as a "line replaceable unit" (LRU). An aircraft may carry numerous, different types of LRUs including, for example, a mission computer, a flight management unit, an autopilot unit, a communications unit, a navigation unit, a collision avoidance unit, and the like. Because LRUs may perform important functions during aircraft operation, an aircraft may include multiple redundant LRUs that add significant weight and consume valuable space on board an aircraft. Moreover, a fleet of aircraft may use different versions of the same type of LRU. However, developing, testing, and maintaining various LRU types and versions are associated with significant lifecycle costs (e.g., engineering, manufacturing, testing, integration, qualification, maintenance, and storage). For example, incompatibilities or other undesirable artifacts within the aircraft system or between various LRUs may not be discovered until construction and integration of the LRUs are complete. Additionally, each of the LRUs installed on an aircraft increases operational costs (e.g., by adding weight and reducing range).

SUMMARY

The present disclosure is directed to emulating hardware devices using virtual hardware. A process in accordance with various implementations consistent with the present disclosure includes using virtual devices of a virtualization system configured to emulate the hardware devices. The process also includes installing in a physical system, instances of the virtualization system including the virtual devices. The process further includes emulating the hardware devices of the physical system using the virtual devices. Additionally, the process includes communicating with equipment of the physical system using the virtual devices.

Additionally, a system in accordance with various implementations consistent with the present disclosure includes instances of a virtualization system having a processor and a computer-readable storage device storing program instructions. When executed by the processor, the program instructions cause the virtualization system to perform operations including emulating special-purpose computing units using virtual devices. The system also includes a computer network communicatively connecting the instances of the virtualization system. The system further includes equipment that communicates with the special-purpose computing units using the computer network.

Further, an aircraft platform in accordance with various implementations consistent with the present disclosure includes an avionics network, line-replaceable avionics units communicatively connected by the avionics network, aircraft equipment configured to communicate with the plurality of line-replaceable units using the avionics network, and instances of a virtualization system. The virtualization system includes a processor and a computer-readable storage device storing program instructions. When executed by the processor, the program instructions cause the virtualization system to perform operations including emulating the line-replaceable avionics units using a plurality of virtual devices. The instances of the virtualization system are remotely located from one another in the aircraft platform. The virtual devices operate redundantly of the plurality of line-replaceable units.

BRIEF DESCRIPTION OF THE DRAWINGS

The accompanying drawings, which are incorporated in and constitute a part of this specification, illustrate the present teachings and together with the description, serve to explain the principles of the disclosure.

DETAILED DESCRIPTION

Systems, processes, and computer program products disclosed herein are directed to providing high-fidelity emulation of special-purpose hardware devices using virtual hardware. Implementations of systems, processes, and computer program products consistent with the present disclosure improve upon existing computer hardware technology by replacing or augmenting the special-purpose hardware devices of an operational system with the virtualized hardware. A virtualization system consistent with the present disclosure can emulate a number of different hardware devices and their physical interfaces. For example, a single virtualization system can emulate an entire avionics suite of an aircraft platform (e.g., LRUs) and its associated connectivity devices (e.g., switch boards and networking components). And, because the virtualization system can be substantially smaller and/or lighter than the avionics suite, replacing or augmenting hardware devices, virtualization systems in accordance with the present disclosure can provide multiple layers of redundancy, while minimizing space and weight that would otherwise be used to by hardware devices to provide such redundancy.

Additionally, implementations consistent with the present disclosure overcome the problems of current hardware systems (e.g., avionics systems) identified previously herein. For example, virtualization systems in accordance with the present disclosure can reduce development costs by making virtual hardware devices available at very early stages in a product development lifecycle and thereby, allow earlier performance of requirements development, software development, and testing. The early availability of virtual hardware devices in comparison to physical hardware devices also allows for earlier discovery of problems in product requirements and designs. Moreover, virtualization systems in accordance with the present disclosure can reduce qualification costs by incurring such costs only once for the hardware of the virtualization systems, rather than for each hardware device (e.g., LRU) emulated by the virtualization system. Further, virtualization systems in accordance with the present disclosure can greatly reduce costs because they can be implemented on a low-cost, generic, and/or commercial off-the-shelf hardware, instead of multiple, different, specialized hardware devices. Further, while current virtualization systems may support device emulation for test purposes, such current virtualization systems do not accurately represent how software executes on actual hardware devices. Thus, implementation consistent with those presented herein can address that problem by accurately representing low level system functionality.

Figure 1:
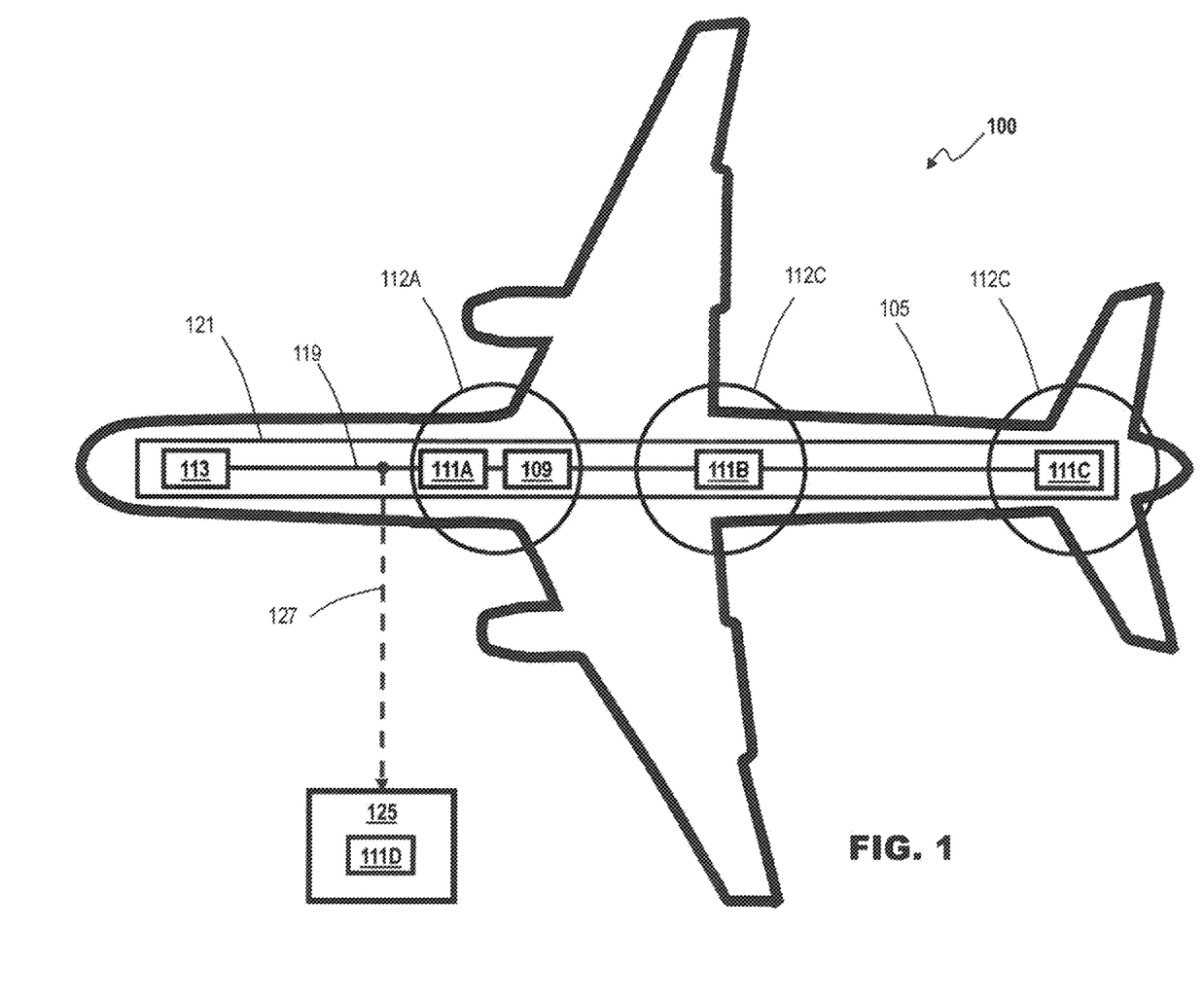
FIG. 1 shows a system block diagram illustrating an example of an environment for implementing systems and processes, in accordance with aspects of the present disclosure.

FIG. 1 shows a block diagram illustrating an example of an environment 100 for implementing systems and processes in accordance with aspects of the present disclosure. The environment 100 can comprise a physical system 105, which can include hardware devices 109 (e.g. avionics devices or computing devices), one or more virtualization systems 111, and equipment 113, all of which can be connected by communication links 119 in a network 121. In some implementations, the physical system 105 can be an operational system (e.g., a vehicle or a plant). In some implementations, the physical system it can be a test and evaluation system (e.g., a vehicle simulator or an integration test bench).

As depicted in FIG. 1, the physical system 105 can be an aircraft platform having multiple instances of the virtualization system 111A, 111B, and 111C that emulate the hardware devices 109. In some implementations, some or all of the instances of the virtualization system 111 can be redundant of the hardware devices 109 and the physical system can failover to the virtualization system 111 in the event one or more of the hardware devices 109 fail. For example, the instances of the virtualization system 111 can provide failover for the hardware devices 109. In some implementations, some or all of the instances of the virtualization system 111 can function in parallel with the hardware devices 109. For example, the hardware devices 109 and the instances of the virtualization system 111 can perform voting operations to increase robustness of the physical system 105.

The hardware devices 109 can be one or more computer-implemented hardware devices. In implementations, the hardware devices 109 can be special-purpose computing units capable of executing computer program instructions installed thereon (e.g., application-specific computing devices). For example, the hardware devices 109 can include one or more avionics devices (e.g., LRUs of an avionics suite).

The virtualization systems 111 can be computing systems comprised of hardware and software that emulate the hardware devices 109. In implementations, each of the virtualization systems 111 can be one or more general purpose computers that host one or more virtual hardware devices that emulate multiple hardware devices, as well as the interfaces and connectivity of such hardware devices. For example, the virtualization systems 111 can include emulations of the hardware and the software interfaces (e.g., peripherals, data links, interrupt behavior, and timing requirements) of the hardware devices 109. Additionally, in implementations, the virtualization systems 111 can execute exact or substantially exact copies (e.g., an image) of the application software executed by the different hardware devices 109. For example, the virtualization system 111 can use QUICK EMULATOR ("QEMU"), which is an open source software application that performs hardware virtualization.

The equipment 113 can be one or more devices or systems that communicate with and/or are controlled by the hardware devices 109 and the virtualization system 111. In implementations, the one or more devices of the equipment 113 include network interfaces that communicate with the hardware devices 109 and the virtualization systems 111 via the communication links 119. The equipment 113 can include various input/output devices, such as, aircraft flight controls (e.g., stick, pedal, and throttle), input/output systems (e.g., switches and buttons), sensors (e.g., position sensors and pitot tubes), actuators (e.g., servo motors), displays (e.g., a cockpit display), and lighting. For example, the equipment 113 can include an aircraft stick and throttle that provides steering inputs to the physical and/or virtual flight control LRUs within the hardware devices 109 and the virtualization system 113. Additionally, for example, the equipment can include a navigation and display unit the sends and receives navigation information from navigation LRUs within the hardware devices 109 and the virtualization system 113.

The communication links 119 can be a medium used to communicate between various devices and computers connected together within the network 121 physical system 105, including the hardware devices 109, the virtualization systems 111, and the equipment 113. As depicted in the example, the network 121 communicatively connects, the hardware devices 109, the virtualization system 111, and the equipment 113. For example, the network 121 can be an avionics network communicatively linking avionics LRUs. The communication links 119 may be wired and/or wireless communication links.

In some implementations, the environment 100 includes a second physical system 125 communicatively linked to the hardware devices 109 and the virtualization systems 111, via a communication link 127. The physical system 125 and the communication link 127 can be the same or similar to the physical system 105 and the communication links 119 previously described. In some implementations, the physical system 105 can be an aircraft and the physical system 125 can be a ground test platform that communicates with the virtualization system 111 and the hardware devices 109. For example, the physical system 125 can store software aircraft parts within a library or storage system. Also, the physical system can be another aircraft platform, an air traffic control (ATC) system, or maintenance system connected to the physical system 105 using the communication link 127 (e.g., using commercial datalinks such as the Aircraft Communications, Addressing and Reporting System (ACARS), or some other air traffic network (ATN).

In some implementations, the physical system 125 comprises an engineering, development and/or testing system comprising a general-purpose computing system that executes an instance of the virtualization system 111D that emulates one or more of the hardware devices 109 in a same or similar manner to the instances of the virtualization system 111A, 111B, and 111C, as described above. Hence, in accordance with some implementations, a developer (e.g., software coder) can create and/or modify the virtualization system 111 in the physical system 125, as virtualization system 111D. The modified instance of the virtualization system 111D can be tested and changed within physical system 125. Additionally, the modified instance of the virtualization system 111D can be tested in combination with the physical system 105. For example, the virtualization system 111D can be used in an installed system test with the physical devices 109 and equipment 113 of an aircraft to validate and/or verify its functionality before any other instances (e.g., 111A, 111B, and 111C) are installed on the aircraft. After the modified instance of the virtualization system 111D has be validated and, copies can be seamlessly ported from the physical system 125 to the physical system 105 to replace the instances of the virtualization system 111A, 111B, and 111C.

As noted above, the virtualization systems 111 improves upon existing technology by using a single instance of the virtualization systems 111, to emulate a number of hardware devices 109. Thus, the virtualization systems 111 may be substantially smaller and lighter than the hardware devices 109. Additionally, the virtualization systems 111 improve upon existing technology because each one can be physically distributed in the physical system 105 in locations remote from one another. For example, in the example depicted in FIG. 1, the virtualization systems 111 can be distributed at the front, middle, and back of an aircraft platform. In some implementations, additional virtualization systems 111 can be place around the aircraft. Thus, the distributed instances of the virtualization system 111 can provide multiple failovers for the hardware devices and one another in case of that localized damage to the aircraft, without substantially increasing the weight of the physical 105 system. Additionally, by distributing the instances of the virtualization system 111, implementations of the present disclosure can reduce bandwidth and latency of information traversing the communication links 119 and 127. For example, a particular instance of the virtualization system 111A that processes real-time, full-motion, three-dimensional color imagery from a LIDAR LRU may be located adjacent to the LIDAR LRU and delegated responsibility for processing the output of such LRU to reduce communication latency and processing load on a hardware device 109.

Figure 2:
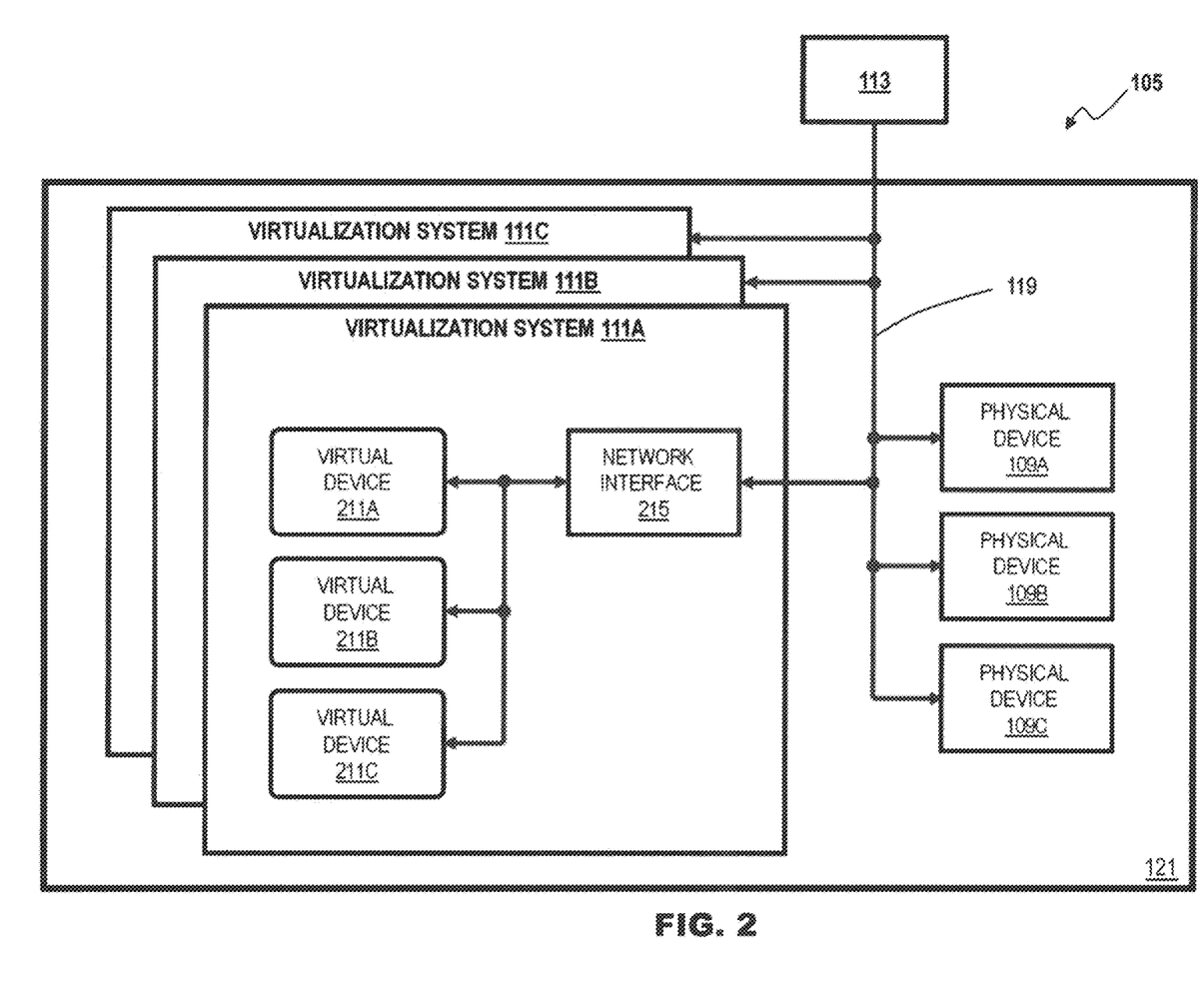
FIG. 2 shows a system block diagram illustrating an example of a physical hardware system, in accordance with aspects of the present disclosure.

FIG. 2 shows a system block diagram illustrating an example of a physical hardware system 105 in accordance with aspects of the present disclosure. The physical hardware system 105 can be the same or similar to that previously described. The physical hardware system 105 includes hardware devices 109A, 109B, and 109C, one or more virtualization systems 111A, 111B, 111C, equipment 113 communication link 119, and network 121, which can also be the same or similar to those previously described.

The virtualization systems 111A, 111B, and 111C can include one or more virtual devices 211A, 211B, and 211C, and a network interface 215. The virtual devices 211 can be emulations of the hardware devices 109A, 109B, and 109C within the virtualization systems 111. The virtual devices 211 can be created in a same or similar manner to that described in U.S. patent application Ser. No. 15,476,025, filed Mar. 31, 2017, and later published as U.S. Patent Application Publication No. 20180285134, the entire contents of which is incorporated herein in its entirety. Program code of the virtual devices 211 can be the application code for the hardware devices 109 (e.g., avionics LRUs). For example, the hardware devices 109A, 109B, and 109C can be a mission computer LRU, a flight management LRU, and a navigation LRU, respectively. The virtual devices 211A, 211B, and 211C of the one or more virtualization systems 111 can be a virtual mission computer LRU, a virtual flight management LRU, and a virtual navigation LRU, respectively. The program code can also include the source code (e.g., operating system), interface code (e.g., timing and formatting), and/or interrupt logic of hardware components and the communication links included in the hardware devices 109.

In some implementations, the virtual devices 211 can provide vertical and/or horizontal redundancy for the hardware devices 109 and for one another. Accordingly, in implementations, the virtual devices 211 can provide failovers if any of the hardware devices 109 fail. For example, if the virtual device 211A determines that the corresponding hardware device 109A has not communicated for a predefined period of time, or if it determines that the corresponding hardware device 109A indicated a failure event, then the virtual device 211A can substitute itself into the network 121 for the hardware device 109A. Additionally, in some implementations, the virtual devices 211 can operate in combination with the hardware devices 109. For example, each of the virtual devices 211A in virtualization devices 111A, 111B, and 111C can perform functional cross-checking for the hardware device 109, as well as for one another. Further, in some implementations, each of the virtual devices 211A in virtualization systems 111A, 111B, and 111C can function to determine voting errors that arise among the various devices 109 and 211.

Figure 3:
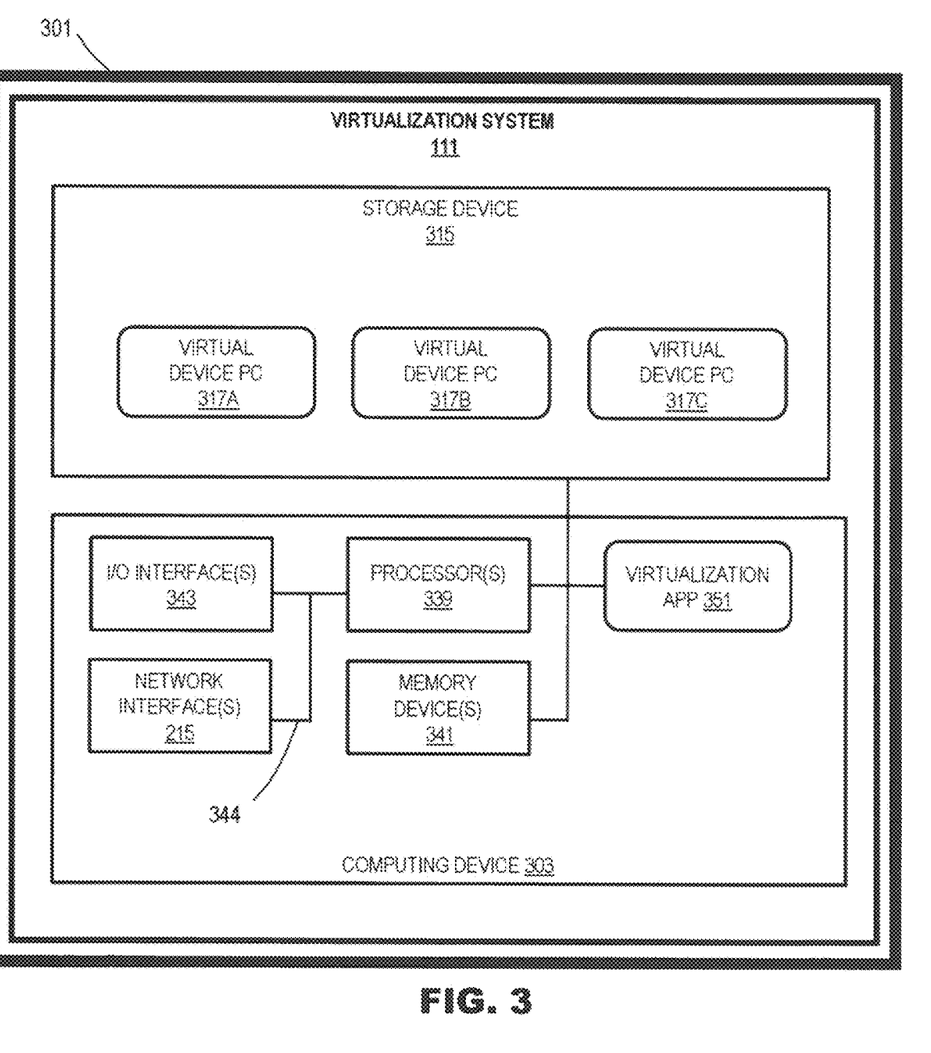
FIG. 3 shows a system block diagram illustrating an example of a virtualization system, in accordance with aspects of the present disclosure.

FIG. 3 shows a system block diagram illustrating an example of a virtualization system 111, which can be the same or similar to that described above. The virtualization system 111 includes hardware and software that perform the processes and functions disclosed herein. The virtualization system 111 can comprise any type of computing system including a combination of general and/or specific purpose hardware capable of executing computer program instructions installed thereon. The virtualization system 111 can include a housing 301, a computing device 303, and a storage device 315. The housing 301 can substantially or entirely enclose the computing device 303, the input/output (I/O) device 313, and the storage device 315. In implementations, the housing 301 can be a ruggedized enclosure. For example, the housing 301 can be as avionics enclosure ruggedized against vibration, moisture, and electro-magnetic interference.

The storage device 315 can comprise a computer-readable, non-volatile hardware storage device that stores information and program instructions. For example, the storage device 315 can be one or more flash drives and/or hard disk drives. In accordance with aspects of the present disclosure, the storage device 315 can store program code ("PC") of virtual devices 317A, 317B, and 317C (e.g., virtual devices 211A, 211B, and 211C). The program code can be application software of a physical hardware devices (e.g., hardware devices 109A, 109B, and 109C of physical system 105). In implementations, the program code of the virtual devices 317A, 317B, and 317C substantially mirrors that of the corresponding physical hardware devices, in a same or similar manner to that described in U.S. patent application Ser. No. 15/476,025, filed Mar. 31, 2017, described above.

In embodiments, the computing device 303 includes one or more processors 339 (e.g., microprocessor, microchip, or application-specific integrated circuit), one or more memory devices 341 (e.g., RAM, read-only memory (ROM)), one or more I/O interfaces 343, and one or more network interface devices 215. The memory devices 341 can include a local memory (e.g., a random-access memory and a cache memory) employed during execution of program instructions. Additionally, the computing device 303 includes at least one communication channel 344 (e.g., a data bus) by which it communicates with the I/O device 313 and the storage device 315. The processor 339 executes computer program instructions (e.g., an operating system and/or application programs), which can be stored in the memory device 341 and/or storage device 315.

The processor 339 can also execute computer program instructions of a virtualization application 351 (e.g., QEMU). The virtualization application 351 can be the same or similar to that previously described. For example, the virtualization application 351 can include a hypervisor or virtual machine monitor software. In accordance with aspects of the present disclosure, the virtualization application 351 can process the virtual device program code 317A, 317B, 317C to provide virtual device (e.g., virtual devices 211A, 211B, and 211C).

It is noted that the computing device 303 is representative of various possible equivalent-computing devices that can perform the processes described herein. In the disclosed embodiments, the program instructions and hardware can be created with a general-purpose computing device using standard programming and engineering techniques, respectively.

Figure 4:
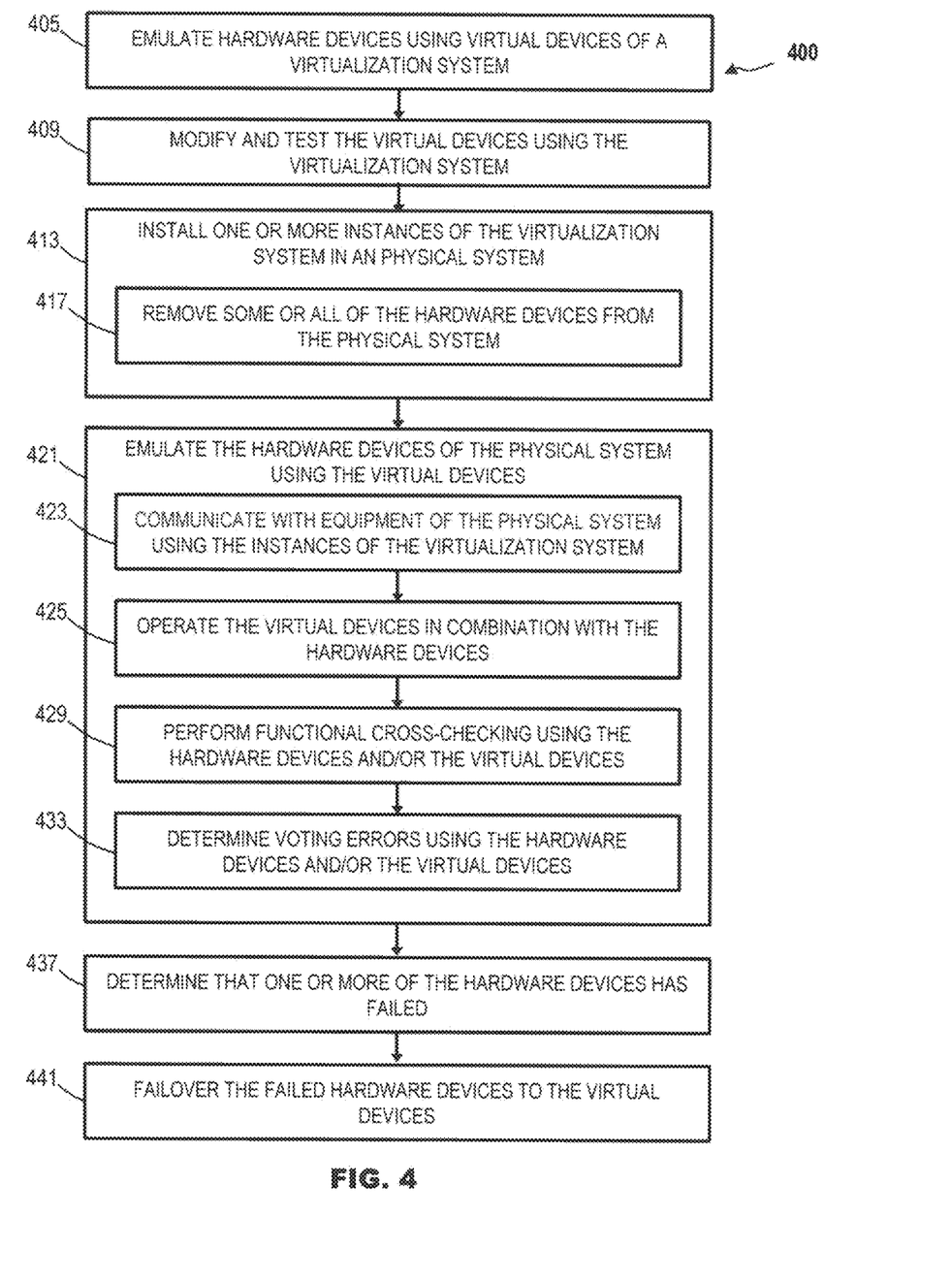
FIG. 4 illustrates a functional flow diagram illustrating an example of process performed by systems, methods, and computer program products, in accordance with aspects of the present disclosure.

The flow diagram in FIG. 4 illustrates an example of the functionality and operation of possible implementations of systems, methods, and computer program products according to various implementations consistent with the present disclosure. Each block in the flow diagram of FIG. 4 can represent a module, segment, or portion of program instructions, which includes one or more computer executable instructions for implementing the illustrated functions and operations. In some alternative implementations, the functions and/or operations illustrated in a particular block of the flow diagram can occur out of the order shown in FIG. 4. For example, two blocks shown in succession can be executed substantially concurrently, or the blocks can sometimes be executed in the reverse order, depending upon the functionality involved. It will also be noted that each block of the flow diagram and combinations of blocks in the block can be implemented by special purpose hardware-based systems that perform the specified functions or acts, or combinations of special purpose hardware and computer instructions.

FIG. 4 illustrates a flow diagram of an exemplary process 400 including operations performed in accordance an embodiment of the present disclosure. In implementations, the process 400 can be used to emulate special-purpose hardware devices as virtual devices using a virtualization system, and to install multiple instances of the virtualization system in a physical system, such as an aircraft platform. More specifically, at 405, the hardware devices (e.g., hardware devices 109) of a physical hardware system (e.g., physical system 105) can be emulated using virtual devices (e.g., virtual devices 211) of a virtualization system (virtualization system 111). For example, the hardware devices can be avionics LRUs of the aircraft platform. The virtual devices can comprise program code of the hardware devices that is implemented in the virtualization system. The emulating can include configuring an address space of the virtualization system (e.g., using a memory map) to match the address space of the physical hardware system and/or the virtual devices. The emulating can also include exchanging information among the virtualization system and/or the virtual devices by registering memory locations using a memory map. For example, the memory addresses and ranges for memory registers of the physical hardware system and hardware devices can be registered with the virtualization system, and used to implement the functionality of each memory register found for the virtualization system and the virtual devices. By doing so, the virtualization system and the virtual devices can communicate with a computer network (e.g., computer network 121) via the memory constructs of the virtualization system by reading and writing information in the same manner as the hardware devices of the physical hardware system.

At 409, virtualization system can be used to modify and test the virtual devices emulated at 405 by emulating the operation of the hardware devices using the virtualization system. Consistent with the examples previously described herein, the virtualization system can be modified and/or tested using an engineering, development and/or testing system, which can be a general-purpose computing system (e.g., physical system 125) that emulates one or more of the hardware devices (e.g., hardware devices 109) or a system of such devices. Additionally, as previously described, the virtualization system can be tested in combination with a target system for the virtualization system (e.g. physical system 105). For example, the virtualization system can be used in an installed system test of an aircraft to validate and/or verify its functionality.

At 413, one or more instances of the virtualization system can be installed in a physical hardware system (e.g., physical system 105). Several instances of the virtualization system (e.g., instances of virtualization 111A, 111B, and 111C), which can be copies of the virtualization system tested at 409 (e.g., instance 111D) can be installed on a target system (e.g., physical system 105) and communicatively connected in a network (e.g., network 121) of the target system. For example, the instances of the virtualization system can emulate avionics LRUs and can be incorporated into an avionics network of an operational aircraft platform. In implementations, the various instances of the virtualization system can be installed at remote locations (e.g., locations 112) with respect to one another. Doing so can place the instances of the virtualization system so as to avoid localized damage to one area of the aircraft from damaging all instances of the virtualizations system. For example, in an aircraft, a first instance may be located in the front of an aircraft fuselage, a second instance can be located mid-fuselage, and a third instance can be located in the rear of the fuselage. Additional instances can be located in other locations of the aircraft. In some implementations, at 417, installing the one or more instances of the virtualization system include removing some or all of the hardware devices from the operational system, so as to entirely replace the hardware devices and control the physical hardware system using only the virtualization system.

At 421, the virtual devices installed at 413 can be used to emulate the hardware devices in the physical hardware system, as previously described herein. In implementations, at 423, the one or more virtualization systems installed at 413 can communicate with equipment of the physical system using the network. For example, the equipment can be input/output devices of an aircraft platform, such as control systems (e.g., stick, pedal, and throttle), input/output systems (e.g., switches and buttons), sensors (e.g., position sensors and pitot tubes), actuators (e.g., servo motors), displays (e.g., a cockpit display), and lighting. In some implementations, at 425, emulating the hardware devices can include operating the one or more virtual devices in parallel with the one or more hardware devices. In some implementations, at 429, emulating the hardware devices can include functional cross-checking using the hardware devices and/or the virtual devices. And, in some implementations, at 433, emulating the hardware devices can include determining voting errors using the hardware devices and/or the virtual devices.

At 437, a virtual device can determine that one or more of the hardware devices and/or one or more of the virtualizations systems have failed. For example, a virtual navigation LRU can detect that a corresponding hardware navigation LRU has stopped communicating, which may be due to, e.g., damage, malfunction, or power loss. At 441, the virtual device can function as a failover for the hardware devices or virtualization systems determined to have failed at 437. For example, damage occurring an in avionics bay of an aircraft may cause failure of an avionics suite (e.g., hardware device 109) and a first virtualization system (e.g., virtualization system 111A). A second virtualization system (e.g., virtualization system 111B) and/or a third virtualization system (e.g., virtualization system 111C) installed on the aircraft at 413 may detect the failure of the first virtualization system and, based on such detection, begin to control equipment of the aircraft (e.g., equipment 113). In some implementations, the first virtualization system, the second virtualization system, and the third virtualization system may have a predefined failover priorities. For example, such that the second virtualization system is configured as a failover for the first virtualization system, and the third virtualization system is configured as a failover for the second virtualization system. In other implementations, the first virtualization system, the second virtualization system, and the third virtualization system operate in parallel such that, if any one of the virtualization systems fails, the remaining virtualization systems continue to operate without regard to the failed virtualization system.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What we claim is:
1. A method comprising:
    emulating, on a second physical system, one or more hardware devices of an aircraft platform using virtual devices of a virtualization system, wherein the one or more hardware devices comprises one or more line replaceable units and wherein the emulating comprises receiving information regarding one or more of the hardware devices of the aircraft platform embedded in a first physical system;
    emulating the one or more of the hardware devices as one or more virtual devices of one or more virtualization systems in the second physical system based on the information that is received; and
    cross-checking functionality of the virtual devices of the one or more virtualization systems, wherein for each hardware device the functionality of the virtual devices is the same as the functionality of the one or more hardware devices;
    transferring a copy of the one or more virtualization systems from the second physical system to the first physical system;
    installing in the first physical system, the copy of the virtualization systems that is transferred having the one or more virtual devices, wherein the one or more virtual devices are provided in place of the one or more hardware devices, wherein the installing comprises:

instantiating the one or more transferred virtualization system, including instantiating the one or more virtual devices of the respective virtualization system; and substituting the one or more hardware devices of the aircraft platform in the first physical system with the one or more instantiated virtualization systems and their respective virtual devices; and communicating with equipment of the second physical system using the one or more of the virtual devices, wherein the equipment comprises at least one of an input or output device of the aircraft platform.

2. The method of claim 1, wherein the installing comprises communicatively connecting at least two instances of virtualization systems to a computer network.

3. The method of claim 1, wherein the communicating comprises operating the virtual devices in combination with the physical system.

4. The method of claim 1, wherein the communicating with the equipment comprises performing functional cross-checking using the one or more virtual devices of at least two instances of the virtualization system.

5. The method of claim 1, wherein the copy of the virtualization systems is installed in different areas of the aircraft platform.

6. The method of claim 5, wherein the different areas comprise a front of an aircraft fuselage, an area in mid-fuselage, or a rear section of the aircraft fuselage.

7. The method of claim 1, wherein:
one or more instances of the virtualization system comprise at least two instances of the virtualization.

8. The method of claim 1, wherein the installing comprises installing a plurality of instances of virtualization systems at a location that are physically remote from one another within the first physical system.

9. The method of claim 8, wherein the communicating with the equipment comprises controlling the equipment redundantly using the at least two instances of the virtualization system.

10. A system comprising:
a plurality of instances of a virtualization system, the virtualization system comprising a processor and a computer-readable storage device storing program instructions that, when executed by the processor, cause the virtualization system to perform operations comprising:
emulating, within a second physical system, one or more hardware devices of an aircraft platform using virtual devices of a virtualization system, wherein the one or more hardware devices comprise one or more line-replaceable units and wherein the emulating comprises:
receiving information regarding one or more of the hardware devices of the aircraft platform embedded in a first physical system;
emulating the one or more of the hardware devices as one or more virtual devices of one or more virtualization systems in the second physical system based on the information that is received; and
cross-checking functionality of the virtual devices of the one or more virtualization systems, wherein for each hardware device the functionality of the virtual devices is the same as the functionality of the one or more hardware devices;
transferring a copy of the one or more virtualization systems from the second physical system to the first physical system;
installing in the first physical system, the copy of the virtualization systems that is transferred having the one or more virtual devices, wherein the one or more virtual devices are provided in place of the one or more hardware devices, wherein the installing comprises the steps of:
instantiating the one or more transferred virtualization system, including instantiating the one or more virtual devices of the respective virtualization system; and
substituting the one or more hardware devices of the aircraft platform in the first physical system with the one or more instantiated virtualization systems and their respective virtual devices; and
communicating with equipment of the second physical system using the one or more of the virtual devices, wherein the equipment comprises at least one of an input or output device of the aircraft platform.

11. The system of claim 10, wherein the system further comprises a plurality of virtual devices communicatively connected to the computer network.

12. The system of claim 11, wherein:
the equipment comprises at least one of an input or output device of the aircraft platform.

13. The system of claim 10, wherein the plurality of instances of the virtualization system comprise general-purpose computing systems.

14. The system of claim 10, wherein the plurality of instances of the virtualization system are configured to control the equipment redundantly of a plurality of special-purpose computing units.

15. The system of claim 10, wherein the plurality of instances of the virtualization system are configured to operate in combination with the second physical system using a plurality of virtual devices.

16. The system of claim 10, wherein the plurality of instances of the virtualization system are configured to determine that one or more of the special-purpose computing units has failed.

17. An aircraft platform comprising:
an avionics network;
a plurality of line-replaceable avionics units communicatively connected by the avionics network;
aircraft equipment configured to communicate with the plurality of line-replaceable units using the avionics network; and
a plurality of instances of a virtualization system arranged in different sections of an aircraft platform, the virtualization system comprising a processor and a computer-readable storage device storing program instructions that, when executed by the processor, cause the virtualization system to perform operations comprising:
emulating, on a second physical system, one or more hardware devices of an aircraft platform using virtual devices of a virtualization system, wherein the one or more hardware devices comprises one or more line replaceable units and wherein the emulating comprises
receiving information regarding one or more of the hardware devices of the aircraft platform embedded in a first physical system;
emulating the one or more of the hardware devices as one or more virtual devices of one or more virtualization systems in the second physical system based on the information that is received; and cross-checking functionality of the virtual devices of the one or more virtualization systems, wherein for each hardware device the functionality of the virtual devices is the same as the functionality of the one or more hardware devices;

transferring a copy of the one or more virtualization systems from the second physical system to the first physical system;

installing in the first physical system, the copy of the virtualization systems that is transferred having the one or more virtual devices, wherein the one or more virtual devices are provided in place of the one or more hardware devices, wherein the installing comprises:

instantiating the one or more transferred virtualization system, including instantiating the one or more virtual devices of the respective virtualization system; and substituting the one or more hardware devices of the aircraft platform in the first physical system with the one or more instantiated virtualization systems and their respective virtual devices; and communicating with equipment of the second physical system using the one or more of the virtual devices, wherein the equipment comprises at least one of an input or output device of the aircraft platform, wherein:

a plurality of virtual devices are configured to operate redundantly of the plurality of line-replaceable units; and the plurality of virtual devices function in place of the plurality of line-replaceable avionics units.

18. The aircraft platform of claim 17, wherein the plurality of instances of the virtualization system are configured to operate in combination with the aircraft equipment using the plurality of virtual devices.

19. The aircraft platform of claim 17, wherein the plurality of instances of the virtualization system are configured to determine that one or more of the plurality of line-replacement units has failed.

20. The aircraft platform of claim 17, wherein the copy of the one or more virtualization systems is installed in different areas of the aircraft platform.

\* \* \* \* \*